United States Patent [19]

Mandoh et al.

[11] Patent Number: 5,443,909

[45] Date of Patent: Aug. 22, 1995

[54] MICROCAPSULE CONTAINING ULTRAVIOLET ABSORBER

[75] Inventors: Ritsuo Mandoh, Sakai; Takehiro Minami, Osaka; Katsuhiko Ishida, Takatsuki; Hisayoshi Mitoh, Nagaokakyo, all of Japan

[73] Assignee: Kanzaki Paper Manufacturing Co., Ltd., Tokyo, Japan

[21] Appl. No.: 125,165

[22] Filed: Sep. 23, 1993

Related U.S. Application Data

[62] Division of Ser. No. 985,727, Dec. 4, 1992, Pat. No. 5,272,127.

[30] Foreign Application Priority Data

| Dec. 6, 1991 | [JP] | Japan | 3-349550 |
| Dec. 11, 1991 | [JP] | Japan | 3-327703 |
| Apr. 30, 1992 | [JP] | Japan | 4-111584 |

[51] Int. Cl.⁶ .................. B01J 13/16; F21V 9/06; G02B 5/22
[52] U.S. Cl. .................. 428/402.21; 252/589; 428/402.22
[58] Field of Search ............ 252/589; 428/402.21, 428/402.22; 430/512

[56] References Cited

U.S. PATENT DOCUMENTS

| 3,852,401 | 12/1974 | Suzuki et al. | 428/402.22 X |
| 4,056,610 | 11/1977 | Barber, Jr. et al. | 428/402.21 X |
| 4,511,909 | 4/1985 | Arai | 346/208 |
| 4,576,891 | 3/1986 | Adair et al. | 428/402.21 X |
| 4,588,639 | 5/1986 | Ozono | 428/402.22 |
| 4,626,877 | 12/1986 | Arai et al. | 346/200 |
| 4,663,642 | 5/1987 | Kameda et al. | 346/217 |
| 4,828,955 | 5/1989 | Kasai et al. | 428/402.21 X |
| 5,047,314 | 9/1991 | Sakai et al. | 430/512 X |

FOREIGN PATENT DOCUMENTS 2171810  9/1986  United Kingdom.

Primary Examiner—Richard D. Lovering
Attorney, Agent, or Firm—Nikaido, Marmelstein, Murray & Oram

[57] ABSTRACT

The present invention provides a heat sensitive recording material comprising a substrate, a recording layer formed over the substrate and containing a colorless or light-colored basic dye and a color acceptor, and a protective layer formed over the recording layer, the recording material being characterized in that microcapsules having an ultraviolet absorber enclosed therein and having substantially no color forming ability are incorporated in the protective layer.

Further, the present invention provides microcapsules having an ultraviolet absorber and as required an organic solvent enclosed therein, which have capsule wall film of synthetic resin and mean particle size of 0.1 to 3 μm.

5 Claims, No Drawings

MICROCAPSULE CONTAINING ULTRAVIOLET ABSORBER

This is a division of application Ser. No. 07/985,727 filed Dec. 4, 1992, now U.S. Pat. No. 5,272,127.

The present invention relates to heat sensitive recording materials which are excellent in preservation stability especially in resistance to light, and microcapsules having an ultraviolet absorber enclosed therein, which are applicable to various fields.

Heat sensitive recording materials are well known which utilize a color forming reaction between a colorless or light-colored basic dye and an organic or inorganic color acceptor to obtain record images by thermally bringing the two chromogenic substances into contact with each other. Such heat sensitive recording materials are relatively inexpensive, are adapted for use with recording devices which are compact and easy to maintain, and have therefore found wide applications as recording media for facsimile systems, various computers, etc.

As one of these applications, heat sensitive recording materials are used in the form of labels, for example, for the POS (point of sales) system. Aside from such labels which are used for food products and are in service usually for a short period of time, growing uses of this system involve increased use of heat sensitive recording materials as tag sheets which are used as affixed to commodities for a long period of time, or as handy terminal (portable or pocketable thermal printer) sheets for the collection and delivery of goods which are handled frequently outdoors. In such use, however, the recording material is often exposed to indoor light or sunlight for a prolonged period of time and becomes yellowed over the background area of the material under the influence of the light, consequently seriously impairing the image of the commercial product. It is therefore strongly desired to provide heat sensitive recording materials which will not yellow over the background area even when exposed to indoor light or sunlight for a prolonged period of time.

In order to improve light resistance of heat sensitive recording materials, it has already been proposed to add a finely divided ultraviolet absorber to the heat sensitive recording layer or protective layer. However, the finely divided ultraviolet absorber is low in ultraviolet ray absorption efficiency and therefore fails to achieve a sufficient effect, while use of an increased amount of the absorber entails another drawback such as background fog or a lower recording density. As a result, fully satisfactory resistance to light still remains to be obtained presently.

In the case of heat sensitive recording materials for use as tag sheets or handy terminal sheets, the images recorded thereon must also be resistant to plasticizers, solvents, oils, Eats or secum, etc., so that a protective layer is generally provided over the recording layer. When the protective layer contains the finely divided ultraviolet absorber, the absorber dissolves out owing to the influence of a plasticizer, oil, fat or the like, impairing the function of the protective layer and consequently rendering record images less preservable.

Further, in order to enhance light resistance, it is proposed to coat or apply a pigment which shades ultraviolet ray such as zinc oxide or titanium oxide, or ultraviolet absorber to various sheets in addition to a heat sensitive recording material, for example, to a pressure sensitive recording sheet, ink-jet recording sheet, image-receiving sheet for thermal dye-transfer recording or like recording media, clay-coated paper for printing or like sheets, fibers, fabrics, etc.

However, when obtaining excellent light resistance by use of finely pulverized ultraviolet ray shading agent or ultraviolet absorber, it is necessary to use a comparably large amount of such an agent or absorber, which in turn brings high shading effect and deteriorates record images, printed images or color.

An object of the present invention is to provide a heat sensitive recording material which has a protective layer over a recording layer and which is excellent in light resistance free of yellowing of the background area over a very long period of time without entailing a reduction in recording density or impaired preservation stability of record images.

An another object of the present invention is to provide microcapsules which have excellent retainability of ultraviolet absorber, difficult to be ruptured at a usual pressure and are excellent in ultraviolet ray absorbing efficiency.

The above and other objects of the invention will become apparent from the following description.

The present invention provides a heat sensitive recording material comprising a substrate, a recording layer formed over the substrate and containing a colorless or light-colored basic dye and a color acceptor, and a protective layer formed over the recording layer, the recording material being characterized in that microcapsules having an ultraviolet absorber enclosed therein and having substantially no color forming ability are incorporated in the protective layer.

Further, the present invention provides microcapsules having an ultraviolet absorber and as required an organic solvent enclosed therein, which have capsule wall film of synthetic resin and mean particle size of 0.1 to 3 μm.

The followings are specific examples of ultraviolet absorbers used in the present invention.

Phenyl salicylate, p-tert-butylphenyl salicylate, p-octylphenyl salicylate and like salicylic acid type ultraviolet absorbers;

2,4-Dihydroxybenzophenone, 2-hydroxy-4-methoxybenzophenone, 2-hydroxy-4-octyloxybenzophenone, 2-hydroxy-4-dodecyloxybenzophenone, 2,2'-dihydroxy-4-methoxybenzophenone, 2,2,'-dihydroxy-4,4'-dimethoxybenzophenone, 2-hydroxy-4-methoxy-5-sulfobenzophenone and like benzophenone type ultraviolet absorbers;

2-Ethylhexyl 2-cyano-3,3-diphenyt-acrylate, ethyl 2-cyano-3,3-diphenylacrylate and like cyanoacrylate type ultraviolet absorbers;

Bis(2,2,6,6-tetramethyl-4-piperidyl) sebacate, bis(2,2,6,6-tetramethyl-4-piperidyl) succinate, bis(1,2,2,6,6-pentamethyl-4-piperidyl) 2-(3,5-di-tert-butyl-4-hydroxybenzyl)-2-n-butyl malonate and like hindered amine type ultraviolet absorbers;

2-(2'-Hydroxyphenyl)benzotriazole, 2-(2'-hydroxy-5'-methylphenyl)benzotriazole, 2- (2'-hydroxy-5 -tert-butylphenyl)benzotriazole, 2- (2'-hydroxy-3',5'-di-tert-butylphenyl)benzotriazole, 2- (2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-3',5'-di-tert-butylphenyl)-5-tert-butylbenzotriazole, 2-(2'-hydroxy-3',5'-di-tert-amylphenyl)benzotriazole, 2-(2'-hydroxy-3',5'-di-tert-amylphenyl)-5-tert-amylbenzotriazole, 2-(2'-hydroxy-3',5'-di-tert-amylphenyl)-5-methoxybenzotriazole, 2-[2′-hydroxy-3′-(3″,4″,5″,6″-tetrahydrophthalimido-methyl)-5′-methylphenyl]benzotriazole, 2-(2′-hydroxy-5′-tert-octylphenyl)benzotriazole, 2-(2′-hydroxy-3′-sec-butyl-5′-tert-butylphenyl)benzotriazole, 2-(2′-hydroxy-3′-tert-amyl-5′-phenoxyphenyl)-5-methylbenzotriazole, 2-(2′-hydroxy-5′-n-dodecylphenyl)benzotriazole, 2-(2′-hydroxy-5′-sec-octyloxyphenyl)-5-phenylbenzotriazole, 2-(2′-hydroxy-3′-tert-amyl-5′-phenylphenyl)-5-methoxybenzotriazole, 2-[2′-hydroxy-3′,5′-bis(α,α-dimethylbenzyl)phenyl]benzotriazole and like benzotriazole type ultraviolet absorbers which are solid at ordinary temperature;

2-(2′-Hydroxy-3′-dodecyl-5′-methylphenyl)-benzotriazole, 2-(2′-hydroxy-3′-undecyl-5′-methylphenyl)-benzotriazole, 2-(2′-hydroxy-3′-tridecyl-5′-methylphenyl)-benzotriazole, 2-(2′-hydroxy-3′-tetradecyl-5′-methylphenyl)-benzotriazole, 2-(2′-hydroxy-3′-pentadecyl-5′-methylphenyl)-benzotriazole, 2-(2′-hydroxy-3′-hexadecyl-5′-methylphenyl)-benzotriazole, 2-[2′-hydroxy-4′-(2″-ethylhexyl)oxyphenyl]-benzotriazole, 2-[2′-hydroxy-4′-(2″-ethylheptyl)oxyphenyl]-benzotriazole, 2-[2′-hydroxy-4′-(2″-ethyloctyl)oxyphenyl]-benzotriazole, 2-[2′-hydroxy-4′-(2″-propyloctyl)oxyphenyl]-benzotriazole, 2-[2′-hydroxy-4′-(2″-propylheptyl)oxyphenyl]-benzotriazole, 2-[2′-hydroxy-4′-(2″-propylhexyl)oxyphenyl]-benzotriazole, 2-[2′-hydroxy-4′-(1″-ethylhexyl)oxyphenyl]-benzotriazole, 2-[2′-hydroxy-4′-(1″-ethylheptyl)oxyphenyl]-benzotriazole, 2-[2′-hydroxy-4′-(1″-ethyloctyl)oxyphenyl]-benzotriazole, 2-[2′-hydroxy-4′-(1″-propyloctyl)oxyphenyl]-benzotriazole, 2-[2′-hydroxy-4′-(1″-propylheptyl)oxyphenyl]-benzotriazole, 2-[2′-hydroxy4′-(1″-propylhexyl)oxyphenyl]-benzotriazole, 2-(2′-hydroxy-3′-sec-butyl-5′-tert-butylphenyl-5-n-butylbenzotriazole, 2-(2′-hydroxy-3′-sec-butyl-5′-tert-butylphenyl) -5-tert-pentyl-benzotriazole, 2-(2′-hydroxy-3′-sec-butyl-5′-tert-butylphenyl)-5-n-pentyl-benzotriazole, 2-(2′-hydroxy-3′-sec-butyl-5′-tert-pentylphenyl)-5-tert-butylbenzotriazole, 2-(2′-hydroxy-3′-sec-butyl-5′-tert-pentylphenyl)-5-n-butylbenzotriazole, 2-(2′-hydroxy-3′,5′-di-tert-butylphenyl)-5-sec-butylbenzotriazole, 2-(2′-hydroxy-3′,5′-di-tert-pentylphenyl)-5-sec-butylbenzotriazole, 2-(2′-hydroxy-3′-tert-butyl-5′-tert-pentylphenyl)-5-sec-butylbenzotriazole, 2-(2′-hydroxy-3′,5′-di-sec-butylphenyl)-5-chlorobenzotriazole, 2-(2′-hydroxy-3′,5′-di-sec-butylphenyl)-5-methoxybenzotriazole, 2-(2′-hydroxy-3′,5′-di-sec-butylphenyl)-5-tert-butylbenzotriazole, 2-(2′-hydroxy-3′,5′-di-sec-butylphenyl)-5-n-butylbenzotriazole, octyl 5-tert-butyl-3-(5-chloro-2H-benzotriazole-2-yl)-4-hydroxybenzene-propionate, condensate of methyl 3-[3-tert-butyl-5-(2H-benzotriazole-2-yl)-4-hydroxyphenyl]propionate and polyethylene glycol (molecular weight: about 300) and like benzotriazole type ultraviolet absorbers which are liquid at ordinary temperature. Of course, the ultraviolet absorber is not limited to thereabove and can be used as required in a mixture of at least two of them. The ordinary temperature means about 20° C.

Among the above ultraviolet absorbers, preferable is benzotriazole type absorber. Among benzotriazole compounds which are solid at ordinary temperature, preferably used are 2-(2′-hydroxy-5′-methylphenyl)benzotriazole, 2-(2′-hydroxy-3′,5′-di-tert-butylphenyl)benzotriazole and 2-(2′-hydroxy-3′-tert-butyl-5′-methylphenyl)-5-chlorobenzotriazole which exhibit excellent light-reisitance improving effect.

A benzotriazole compound which is liquid at ordinary temperature is more advantageous than a benzotriazole compound which is solid at ordinary temperature, because the former is not required to be solved in an organic solvent or dissolved in a small amount thereof for adjusting the viscosity when preparing oil-in-water microcapsules and thus the benzotriazole compound can be incorporated in microcapsules at a high concentration which brings particularly improved ultraviolet ray absorbing ability.

Among benzotriazole compounds which are liquid at ordinary temperature, preferable are 2-(2′-hydroxy-3′-dodecyl-5′-methylphenyl)benzotriazole, 2-[2′-hydroxy-4′-(2″-ethylhexyl)oxyphenyl]benzotriazole, octyl 5-tert-butyl-3-(5-chloro-2H-benzotriazole-2-yl)-4-hydroxybenzene-propionate and condensate of methyl 3-[3-tert-butyl-5-(2H-benzotriazole-2-yl)-4-hydroxyphenyl]propionate and polyethylene glycol (molecular weight: about 300). Among these, particularly preferable are 2-(2′-hydroxy-3′-dodecyl-5′methylphenyl)benzotriazole, 2-[2′-hydroxy-4′-(2″-ethylhexyl)oxyphenyl]benzotriazole and octyl 5-tert-butyl-3-(5-chloro-2H-benzotriazole-2-yl)-4-hydroxybenzene-propionate which easily give microcapsules having excellent retainability, and do not afford adverse effect on preservation stability of record images when used in preparing, for example, a heat sensitive recording material.

Although the amount of ultraviolet absorber to be used in a heat sensitive recording material is not limited specifically, it is desirable to adjust the amount preferably to 10 to 500 parts by weight, more preferably to 20 to 250 parts by weight, per 100 parts by weight of the basic dye present in the heat sensitive recording layer.

The important feature of the present invention is that microcapsules having the above-described ultraviolet absorber enclosed therein and having substantially no color forming ability are incorporated in the protective layer to be formed over the heat sensitive recording layer. "Microcapsules having substantially no color forming ability" means that those not containing a basic dye or a color acceptor, the former forms a color in contact with a color acceptor (acidic substance) and the latter forms a color in contact with a basic dye. Although various heat- or pressure-sensitive recording materials have been proposed which comprise microcapsules having enclosed therein an ultraviolet absorber along with a colorless or light-colored basic dye, these microcapsules contain the basic dye and therefore become colored with an increase in the amount of light to which they are exposed, further failing to exhibit a satisfactory effect to give improved light resistance over a long period.

The microcapsules for use in the present invention can be prepared by various known methods. They are prepared generally by emulsifying and dispersing the core material (oily liquid) comprising an ultraviolet absorber and, as required, an organic solvent in an aqueous medium, and forming a wall film of high-molecular-weight substance around the resulting oily droplets.

Examples of useful high-molecular-weight substances for forming the wall film of microcapsules are polyurethane resin, polyurea resin, polyamide resin, polyester resin, polycarbonate resin, aminoaldehyde resin, melamine resin, polystyrene resin, styrene-acrylate copolymer resin, styrene-methacrylate copolymer resin, gelatin, polyvinyl alcohol, etc. Especially, microcapsules having a wall film of a synthetic resin, particularly polyurea resin, polyurethane-polyurea resin and aminoaldehyde resin among other resins have excellent retainability of an ultraviolet absorber and high heat resistance and accordingly exhibit the outstanding additional effect to serve the function of a pigment which is to be incorporated in the protective layer for preventing sticking to the thermal head. Moreover, microcapsules having a wall film of polyurea resin or polyurethane-polyurea resin are lower in refractive index than microcapsules with wall films of other materials and usual pigments, are spherical in shape and are therefore usable favorably because even if present in a large quantity in the protective layer, they are unlikely to reduce the density of record images (so-called whitening) owing to irregular reflection of light. Further, polyurea resin and polyurethane-polyurea resin are more elastic than aminoaldehyde resin and therefore polyurea resin and polyurethane-polyurea resin are preferably used as a wall film for microcapsules which are used under a condition of high pressure. On the other hand, microcapsules having a wall film made from aminoaldehyde resin have a merit that the wall film can be controlled in thickness without depending on particle size of emulsion because the microcapsules can be prepared by adding a wall-forming material after emulsification of a core material.

Microcapsules having a wall film of polyurea resin or polyurethane-polyurea resin are disclosed for example in JP-B-19574/1963, 446/1967, 771/1967 and U.S. Pat. No. 3796669 and are prepared with use of a polyisocyanate, a combination of a polyisocyanate and a polyol reactive therewith, an adduct of polyisocyanate and polyol, or like capsule wall-forming material, by admixing the wall-forming material with the core material to be encapsulated, emulsifying and dispersing the mixture in an aqueous medium containing polyvinyl alcohol or like protective colloid, and raising the temperature of the dispersion to cause a polymer forming reaction at the interface between the oily droplets and the aqueous medium.

Examples of polyisocyanate compounds are m-phenylene diisocyanate, p-phenylene diisocyanate, 2,6-tolylene diisocyanate, 2,4-tolylene diisocyanate, naphthalene-1,4-diisocyanate, diphenylmethane-4,4'-diisocyanate, 3,3'-dimethyldiphenylmethane-4,4'-diisocyanate, xylylene-1,4-diisocyanate, 4,4'-diphenylpropane diisocyanate, trimethylene diisocyanate, hexamethylene diisocyanate, propylene-1,2-diisocyanate, butylene-1,2-diisocyanate, cyclohexylene-1,2-diisocyanate, cyclohexylene-1,4-diisocyanate and like diisocyanates, 4,4',4"-triphenylmethane triisocyanate, toluene-2,4,6-triisocyanate and like triisocyanates, 4,4'-dimethyldiphenylmethane-2,2',5,5'-tetraisocyanate and like tetraisocyanates, adduct of hexamethylene diisocyanate and trimethylolpropane, adduct of 2,4-tolylene diisocyanate and trimethylolpropane, adduct of xylylene diisocyanate and trimethylolpropane, adduct of tolylene diisocyanate and hexanetriol and like isocyanate prepolymers.

Examples of polyols are ethylene glycol, 1,3-propanediol, 1,4-butanediol, 1,5-pentanediol, 1,6-hexanediol, 1,7-heptanediol, 1,8-octanediol, propylene glycol, 2,3-dihydroxybutane, 1,2-dihydroxybutane, 1,3-dihydroxybutane, 2,2-dimethyl-1,3-propanonediol, 2,4-pentanediol, 2,5-hexanediol, 3-methyl-1,5-pentanediol, 1,4-cyclohexanedimethanol, dihydroxycyclohexane, diethyleneglycol, 1,2,6-trihydroxyhexane, phenylethyleneglycol, 1,1,1-trimethylolpropane, hexanetriol, pentaerythritol, glycerin and like aliphatic polyols, 1,4-di(2-hydroxyethoxy)benzene, 1,3-di(2-hydroxyethoxy)-benzene and like condensates of aromatic polyalcohol and alkylene oxide, p-xylylene glycol, m-xylylene glycol, α,α'-dihydroxy-p-diisopropylbenzene, 4,4'-dihydroxydiphenylmethane, 2-(p,p'-dihydroxydiphenylmethyl)benzylalcohol, 4,4'-isopropylidenediphenol, 4,4'-dihydroxydiphenylsulfone, 4,4'-dihydroxydiphenylsulfide, adduct of 4,4'-isopropylidenediphenol and ethylene oxide, adduct of 4,4'-isopropylidenediphenol and propylene oxide.

The polyisocyanate compound and polyol are not limited to thereabove and at least two of them can be used as required.

Among the polyisocyanate compounds, or combinations or adducts of the polyisocyanate and polyol, preferable are those having at least three isocyanate groups in the molecule. More preferable is an adduct of trimethylolpropane or like polyol compound and xylylene diisocyanate which is generally highly viscous and requires a solvent for dilution but the wall film thereof hardly yellows by the exposure of light. Further, more preferable is hexamethylene diisocyanate derivative having a viscosity of up to 1000 cps, preferably up to 800 cps at 25° C. by Brookfield viscometer which does not necessarily require a solvent for dilution and the wall film thereof hardly yellows by the exposure of light. Examples of these hexamethylene diisocyanate derivatives are isocyanurate type hexamethylene diisocyanate (cyclic trimer of hexamethylene diisocyanate), biuret type hexamethylene diisocyanate (trimer of hexamethylene diisocyanate) and isocyanate compounds containing a mixture of trimer, pentamer and higher oligomers of hexamethylene diisocyanate. Particularly preferable are isocyanate compounds containing as a main component isocyanurate type trimer of hexamethylene diisocyanate which are excellent in solubility with ultraviolet absorber.

Microcapsules having a wall film made of aminoaldehyde resin are disclosed, for example, in JP-B-9168/1961, U.S. Pat. No. 4001140 and U.S. Pat. No. 4100103. These microcapsules are generally prepared by in-situ polymerization wherein a core material is emulsified in an aqueous medium containing an emulsifier, thereafter a wall-forming material is added thereto and accumulated on the surface of the core material by adjusting conditions of heat and pH.

As a wall-forming material, it is used a combination of an amine and aldehyde, or a precondensate of these two compounds. Examples of amines are urea, thiourea, alkyl urea, ethylene urea, acetoguanamine, benzoguanamine, melamine, guanidine, biuret, cyanamide and hexamethylenetetramine. Examples of aldehydes are formaldehyde, acetaldehyde, paraformaldehyde, glutaraldehyde, glyoxal and furfural.

In the present microcapsules can be contained as required an organic solvent together with a ultraviolet absorber. The organic solvent is not particularly limited and various hydrophobic solvents can be used which are used in a field of pressure sensitive manifold papers. Examples of organic solvents are tricresyl phosphate, octyldiphenyl phosphate and like phosphates, dibutyl phthalate, dioctyl phthalate and like phthalates, butyl oleate and like carboxylates, various fatty acid amides, diethylene glycol dibenzoate, monoisopropylnaphthalene, diisopropylnaphthalene and like alkylated naphthalenes, 1-methyl-1-phenyl-1-tolylmethane, 1-methyl-1-phenyl-1-xylylmethane, 1-phenyl-1-tolylmethane and like alkylated benzenes, isopropylbiphenyl and like alkylated biphenyls, trimethylolpropane triacrylate and like acrylates, ester of polyol and unsaturated carboxylic acid, chlorinated paraffin and kerosene. These solvents can be used as required in a mixture of at least two of them. Among these hydrophobic media having a high boiling point, tricresyl phosphate and 1-phenyl-1-tolylmethane are desirable since they exhibit high solubility in connection with the ultraviolet absorber to be used in the present invention. Generally, the lower the viscosity of the core material, the smaller is the particle size resulting from emulsification and the narrower is the particle size distribution, so that a solvent having a low boiling point is conjointly usable to lower the viscosity of the core material. Examples of such solvents having a low boiling point are ethyl acetate, butyl acetate, methylene chloride, etc.

The amount of organic solvent to be used should be suitably adjusted according to the kind and amount of ultraviolet absorber to be used and the kind of organic solvent and is not limited specifically. For example in case of using an ultraviolet absorber which is liquid at ordinary temperature, an organic solvent is not necessarily used. However, in case of using an ultraviolet absorber which is solid at ordinary temperature, since it is desired that the ultraviolet absorber be in a fully dissolved state in the microcapsules, the amount of organic solvent, for example in case of microcapsules of polyurea resin or polyurethane-polyurea resin, is adjusted preferably to usually 10 to 60 wt. %, more preferably to 20 to 60 wt. %, based on the combined amount of organic solvent, ultraviolet absorber and wall-forming material. Further, in case of microcapsules of aminoaldehyde resin, the amount of organic solvent is adjusted to usually 50 to 2000% by weight, preferably 100 to 1000% by weight of ultraviolet absorber.

While the amount of capsule wall-forming material to be used is not limited specifically either, preservation for a long period of time is likely to permit the organic solvent in the microcapsules to ooze out to decrease contemplated effects or give adverse effects to a heat sensitive recording material and other materials having microcapsules used, so that it is desired to use a larger amount of wall-forming material than is the case with usual microcapsules used in a pressure sensitive recording material, etc. Thus, for example in case of using microcapsules of polyurea resin or polyurethane-polyurea resin, the wall-forming material is used preferably in an amount of 20 to 70 wt. %, more preferably 25 to 60 wt. %, based on the combined amount of the three components, i.e., the organic solvent which is used as required, ultraviolet absorber and wall-forming material. In case of using microcapsules of aminoaldehyde resin, the wall-forming material is used usually in an amount of 30 to 300% by weight, preferably 35 to 200% by weight of the core material containing as main components ultraviolet absorber and as required organic solvent.

The amount of ultraviolet absorber to be used for encapsulation should be determined suitably according to the kind of ultraviolet absorber and organic solvent to be used, etc. and is not limited specifically. To obtain a remarkable effect, however, it is desirable to use the absorber in an amount of 3 to 80 wt. %, preferably 3 to 75 wt. %, based on the combined amount of the three components, i.e., the organic solvent which is used as required, ultraviolet absorber and wall-forming material.

Emulsifiers (protective colloid agents) useful for microencapsulation are various anionic, nonionic, cationic or amphoteric water-soluble high polymer compounds and the like. These emulsifiers are used as selected depending on the kind of the wall-forming material.

Useful anionic high polymer compounds are natural or synthetic high polymer compounds having $-COO^-$, $-SO_3^-$, $-OPO_3^{2-}$ or like group. They are, for example, natural high polymer compounds such as gum arabic, carrageenan, sodium alginate, pectic acid, tragacanth, armond gum and agar, semisynthetic high polymer compounds such as carboxymethyl cellulose, cellulose sulfate, methyl cellulose sulfate, carboxymethylated starch, phosphorylated starch and ligninsulfonic acid, and synthetic high polymer compounds such as copolymers of maleic anhydride (including one as hydrolyzed), polymers and copolymers of acrylic acid, methacrylic acid or crotonic acid, polymers and copolymers of vinylbenzenesulfonic acid or 2-acrylamido-2-methylpropanesulfonic acid, partial amide derivatives or partially esterified products of such polymers or copolymers, acetoacetyl-modified polyvinyl alcohol, carboxyl-modified polyvinyl alcohol, sulfonic acid-modified polyvinyl alcohol and phosphoric acid-modified polyvinyl alcohol.

More specifically, examples or useful copolymers of maleic anhydride (inclusive of product of hydrolysis thereof) are methyl vinyl ether-maleic anhydride copolymer, ethylene-maleic anhydride copolymer, styrene-maleic anhydride copolymer, α-methylstyrene-maleic anhydride copolymer, vinyl acetate-maleic anhydride copolymer, methacrylamide-maleic anhydride copolymer, isobutylene-maleic anhydride copolymer and the like. Examples of useful acrylic acid copolymers, methacrylic acid copolymers or crotonic acid copolymers are methyl acrylate-acrylic acid copolymer (hereinafter "copolymer" is omitted), ethyl acrylate-acrylic acid, methyl acrylate-methacrylic acid, methyl methacrylate-acrylic acid, methyl methacrylate-methacrylic acid, methyl acrylate-acrylamide-acrylic acid, acrylonitrile-acrylic acid, acrylonitrile-methacrylic acid, hydroxyethyl acrylate-acrylic acid, hydroxyethyl methacrylate-methacrylic acid, vinyl acetate-acrylic acid, vinyl acetate-methacrylic acid, acrylamide-acrylic acid, acrylamide-methacrylic acid, methacrylamide-acrylic acid, methacrylamide-methacrylic acid, vinyl acetate-crotonic acid and like copolymers. Examples of useful vinylbenzenesulfonic acid or 2-acrylamide-2-methylpropanesulfonic acid copolymers are methyl acrylate-vinylbenzenesulfonic acid (or salt thereof) copolymer, vinyl acetate-vinylbenzenesulfonic acid copolymer, acrylamide-vinylbenzenesulfonic acid copolymer, acryloylmorpholine-vinylbenzenesulfonic acid copolymer, vinylpyrrolidone-vinylbenzenesulfonic acid copolymer, vinylpyrrolidone-2-methylpropanesulfonic acid copolymer and the like.

Examples of useful nonionic high polymer compounds are semisynthetic high poplymer compounds having an $-OH$ group, such as hydroxyethyl cellulose, methyl cellulose, pullulan, soluble starch and oxidized starch, synthetic high polymer compounds such as polyvinyl alcohol and silicon-modified polyvinyl alcohol. Examples of useful cationic high polymer compounds are cation-modified polyvinyl alcohol and the like. Examples of useful amphoteric high polymer compounds are gelatin and the like.

Among the above emulsifiers, a completely or partially saponified compound of a modified polyvinyl alcohol such as acetoacetyl-modified polyvinyl alcohol, carboxyl-modified polyvinyl alcohol and silicon-modified polyvinyl alcohol is preferably used when the resulting microcapsule dispersion is applied, for example, to a protective layer of a heat sensitive recording material which requires excellent water resistance, because the above modified polyvinyl alcohol affords excellent water resistance easily with conjoint use of a hardener.

Although the amount of emulsifier to be used is not limited specifically, for example in case of using microcapsules of polyurea resin or polyurethane-polyurea resin it is generally adjusted to 1 to 50 wt. %, preferably to 3 to 30 wt. %, based on the combined amount of the three components, i.e., the wall-forming material, ultraviolet absorber and organic solvent. In case of using microcapsules of aminoaldehyde resin, the emulsifier is used usually in an amount of 1 to 20% by weight, preferably 3 to 10% by weight, based on the combined amount of ultraviolet absorber and organic solvent.

In addition to the ultraviolet absorber, antioxidants, oil-soluble fluorescent dyes, releasing agents, etc. can be incorporated into the microcapsules of the invention when so desired.

Also usable in combination with the foregoing components for encapsulation of microcapsules of polyurea resin and polyurethane-polyurea resin are tin compounds, polyamide compounds, epoxy compounds, polyamine compounds, etc. as reaction accelerators. In the case where polyamine compounds are used, it is desirable to use aliphatic polyamine compounds in view of resistance to light.

When the ultraviolet ray absorbing efficiency, compressive strength of microcapsule, the quality of images of heat sensitive recording material or the like to be recorded, etc. are considered, it is desirable that the microcapsules to be used in the present invention be adjusted to 0.1 to 3 μm, preferably 0.3 to 2.5 μm, in mean particle size.

The amount of microcapsules when incorporated into the protective layer of heat sensitive recording material should be suitably determined in accordance with the kind of ultraviolet absorber, the concentration thereof in the capsules and the desired quality of recording material to be obtained. It is generally desirable to adjust the amount to 5 to 80 wt. % preferably 20 to 70 wt. % based on the total solids content of the protective layer.

The amount of ultraviolet absorber to be used in the protective layer should be adjusted depending on the kind of ultraviolet absorber enclosed in microcapsules and the desired quality of heat sensitive recording material. To improve remarkably light resistance of heat sensitive recording material, particularly to prevent yellowing of background area, it is desirable to apply microcapsules in an amount of, as the amount of ultraviolet absorber, usually 0.1 to 3.0 g/m$^2$, preferably 0.2 to 2.0 g/m$^2$.

Further, the amount of microcapsules used for recording media other than heat sensitive recording material, coated papers for printing or like sheets, or other fibers should be determined suitably according to the degree of desired light resistance.

The present microcapsule thus obtained is not only excellent in ultraviolet ray absorption efficiency but also excellent in retainability of ultraviolet absorber and compressive strength. Accordingly, the present microcapsule is usable for improving light resistance of various materials such as a protective layer of heat sensitive recording material or like recording materials and a vanish for top coating of various printed matters.

In case of using microcapsules in the form of powder, the aqueous microcapsule dispersion is made into a powder of microcapsules by drying the dispersion as prepared, as concentrated by filtration or the like, or as treated by the method disclosed in U.S. Pat. No. 4601863. The dispersion is dried by air drying, flow drying, air-stream drying, spray drying, vacuum drying, freeze drying, infrared drying, high-frequency drying, ultrasonic drying or like method. In case of using microcapsules in the form of a dispersion in a non-aqueous medium, such a dispersion can be prepared by admixing a non-aqueous medium with the aqueous microcapsule dispersion after filtration and removing the aqueous medium from the dispersion. Alternately, the microcapsule powder obtained above is dispersed in a non-aqueous medium to obtain a non-aqueous microcapsule dispersion.

The following is a detailed description about an application of the present microcapsule to a protective layer of a heat sensitive recording material.

In the present heat sensitive recording material, various known colorless or light-colored basic dyes can be used as a basic dye incorporated in the heat sensitive recording layer. Examples thereof are as follows.

Blue-color dyes, e.g., 3,3-bis(p-dimethylaminophenyl)-6-dimethylaminophthalide, 3-(4-diethylamino-2-methylphenyl)-3-(4-dimethylaminophenyl)-6-dimethylamino-phthalide, 3-diethylamino-7-dibenzylaminobenzo[a]fluoran, etc.

Green-color dyes, e.g., 3-(N-ethyl-N-p-tolyl)amino-7-N-methylanilinofluoran, 3-diethylamino-7-anilinofluoran, 3-diethylamino-7-dibenzylaminofluoran, etc.

Red-color dyes, e.g., 3,6-bis(diethylamino) fluoran-γ-anilinolactam, 3-cyclohexylamino-6-chlorofluoran, 3-diethylamino-6-methyl-7-chlorofluoran, 3-diethylamino-7-chlorofluoran, rhodamine(o-chloroanilino)lactam, rhodamine(p-chloroanilino)lactam, 3-diethylamino-7,8-benzofluoran, 3-(N-ethyl-p-toluidino)-7-methylfluoran, 3-diethylamino-6,8-dimethylfluoran, etc.

Black-color dyes, e.g., 3-(N-ethyl-N-isoamyl)amino-6-methyl-7-anilinofluoran, 3-(N-methyl-N-cyclohexyl)amino-6-methyl-7-anilinofluoran, 3-diethylamino-6-methyl-7-anilinofluoran, 3-di(n-butyl)amino-6-methyl-7-anilinofluoran, 3-di(n-pentyl)amino-6-methyl-7-anilinofluoran, 3-diethylamino-7-(o-chlorophenylamino) fluoran, 3-di(n-butyl)amino-7-(o-chlorophenylamino)fluoran, 3-diethylamino-7-(o-fluorophenylamino)-fluoran, 3-di(n-butyl)amino-7-(o-fluorophenylamino)-fluoran, 3-diethylamino-7-(m-trifluoromethylphenylamino)fluoran, 3-(N-ethyl-p-toluidino)-6-methyl-7-anilinofluoran, 3-(N-ethyl-p-toluidino)-6-methyl-7-(p-toluidino)fluoran, 3-(N-ethyl-N-tetrahydrofurfurylamino)-6-methyl-7-anilinofluoran, 3-diethylamino-6-chloro-7-anilinofluoran, 3-(N-methyl-N-n-propylamino)-6-methyl-7-anilinofluoran, 3-dimethylamino-6-methyl-7-anilinofluoran, 3-di(n-butyl) amino-6-methyl-7-m-toluidinofluoran, 3-(N-n-hexyl-N-ethyl) amino-6-methyl-7-anilinofluoran, 3-(N-ethyl-N-isobutyl) amino-6-methyl-7-anilinofluoran, 3-diethylamino-6-methyl-7-p-ethoxyanilinofluoran, 3-pyrrolidino-6-methyl-7-anilinofluoran, 3-piperidino-6-methyl-7-anilinofluoran, 2,2-bis{4-[6'-(N-cyclohexyl-N-methylamino)-3'-methylspiro[phthalide-3,9'-xanthene-2'-ylamino]phenyl}propane, etc.

Dyes having absorption wave in near infrared region, e.g., 3,3-bis[-(4-methoxyphenyl)-1-(4-dimethylaminophenyl)-ethylene-2-yl]-4,5,6,7-tetrachlorophthalide, 3,3-bis[1-(4-methoxyphenyl)-1-(4-pyrrolidinophenyl)ethylene-2-yl]-4,5,6,7-tetrachlorophthalide, 3,3-bis[1,1-bis(4-pyrrolidinophenyl)-ethylene-2-yl]-4,5,6,7-tetrabromophthalide, 3-p-(pdimethylaminoanilino)anilino-6-methyl-7-chlorofluoran, 3-p-(p-chloroanilino)anilino-6-methyl-7-chlorofluoran, 3,6-bis(dimethylamino)fluorene-9-spiro-3'-(6'-dimethylamino)-phthalide, etc. Of course, the basic dye is not limited to thereabove and can be used as required in a mixture of at least two of them.

Various known color acceptors are usable in combination with the above basic dye. Examples thereof are as follows.

Inorganic color acceptors:
Activated clay, attapulgite, colloidal silica, aluminum silicate, etc.

Organic color acceptors (organic acidic substances):
Phenolic compounds, e.g., 4,4'-isopropylidenediphenol, 1,1-bis(4-hydroxyphenyl)cyclohexane, 2,2-bis(4-hydroxyphenyl)-4-methylpentane, 4,4'-dihydroxydiphenylsulfide, hydroquinone monobenzyl ether, benzyl 4-hydroxybenzoate, 4,4'-dihydroxydiphenylsulfone, 2,4'-dihydroxydiphenylsulfone, 4-hydroxy-4'-isopropoxydiphenylsulfone, bis(3-allyl-4-hydroxyphenyl)-sulfone, 4-hydroxy-4'-methyldiphenylsulfone, 4-hydroxyphenyl-4'-benzyloxyphenylsulfone, 3,4-dihydroxyphenyl-4'-methylphenylsulfone, bis(4-hydroxyphenylthioethoxy)methane, 1,5-di(4-hydroxyphenylthio)-3-oxapentane, butyl bis(p-hydroxyphenyl)acetate, methyl bis(p-hydroxyphenyl)acetate, 1,1-bis(4-hydroxyphenyl)-1-phenylethane, 1,4-bis[α-methyl-α-(4'-hydroxyphenyl)ethyl]benzene, 1,3-bis[α-methyl-α-(4'-hydroxyphenyl)ethyl]benzene, di(4-hydroxy-3-methylphenyl)-sulfide, 2,2'-thiobis(3-tert-octylphenol), 2,2'-thiobis(4-tert-octylphenol), etc.

Thiourea compounds, e.g., N,N'-di-m-chlorophenylthiourea, etc.

Aromatic carboxylic acids, e.g., p-chlorobenzoic acid, 4-[2-(p-methoxyphenoxy) ethyloxy]salicylic acid, 4-[3-(p-tolylsulfonyl)propyloxy]salicylic acid, 5-[p-(2-p-methoxy-phenoxyethoxy)cumyl]salicylic acid., etc.

Salt of the aromatic carboxylic acid with a polyvalent metal such as zinc, magnesium, aluminum, calcium, titanium, manganese, tin and nickel.

Metal complex, e.g., complex of antipyrine with zinc thiocyanate.

Composite zinc salt of terephthalaldehydic acid with other aromatic carboxylic acid.

With the heat sensitive recording materials of the invention, the proportions of basic dye and color acceptor are not particularly limited but can be determined suitably according to the kinds of basic dye and color acceptor. For example, usually 1 to 50 parts by weight, preferably 2 to 10 parts by weight, of the color acceptor is used per part by weight of the basic dye.

For preparing the coating composition for the heat sensitive recording layer, the dye and the color acceptor are dispersed, together or individually, into water serving as a dispersion medium, using stirring and pulverizing means such as a ball mill, attritor or sand mill.

In the coating composition, a binder can be conjointly used. Examples of useful binders are starches, hydroxyethyl cellulose, methyl cellulose, carboxymethyl cellulose, gelatin, casein, gum arabic, polyvinyl alcohol, carboxyl-modified polyvinyl alcohol, acetoacetyl-modified polyvinyl alcohol, silicon-modified polyvinyl alcohol, diisobutylene-maleic anhydride copolymer salt, styrene-maleic anhydride copolymer salt, ethylene-acrylic acid copolymer salt, styrene-acrylic acid copolymer salt, styrene-butadiene copolymer emulsion, urea resin, melamine resin, amide resin, polyurethane resin, etc. At least one of these binders is added to the recording layer in an amount of 5 to 30% by weight based on the total solids of the layer.

Various other auxiliary agents can be further added to the coating composition. Examples of useful agents are dispersants such as sodium dioctylsulfosuccinate, sodium dodecylbenzenesulfonate, sodium salt of lauryl alcohol sulfuric acid ester, fatty acid metal salts, etc., waxes such as zinc stearate, calcium stearate, polyethylene wax, carnauba wax, paraffin wax and ester wax, etc, defoaming agents, fluorescent dyes, coloring dyes, etc. Further, in order to enhance light resistance more effectively, it is possible to add microcapsules containing ultraviolet absorber or finely pulverized ultraviolet absorber to the coating composition for the recording layer.

Further, to the coating composition may be added a pigment. Examples of useful pigments are kaolin, clay, calcium carbonate, calcined clay, calcined kaolin, titanium dioxide, kieselguhr, finely divided anhydrous silica, activated clay or like inorganic pigment, styrene microballs, nylon powder, polyethylene powder, urea-formalin resin filler, particles of raw starch or like organic pigment.

Further, a sensitizer can be used as required. Examples of useful sensitizers are stearic acid amide, methoxycarbonyl-N-stearic acid benzamide, N-benzoyl stearic acid amide, N-eicosanic acid amide, ethylenebis stearic acid amide, behenic acid amide, methylenebis stearic acid amide, N-methylol stearic acid amide, dibenzyl terephthalate, dimethyl terephthalate, dioctyl terephthalate, benzyl p-benzyloxybenzoate, phenyl 1-hydroxy-2-naphthoate, 2-naphthyl benzyl ether, m-terphenyl, dibenzyl oxalate, di-p-methylbenzyl oxalate, di-p-chlorobenzyl oxalate, p-benzylbiphenyl, p-tolyl biphenyl ether, di(p-methoxyphenoxyethyl) ether, 1,2-di(3-methylphenoxy)ethane, 1,2-di(4-methylphenoxy)ethane, 1,2-di(4-methoxyphenoxy)ethane, 1,2-di(4-chlorophenoxy) ethane, 1,2-diphenoxyethane, 1-(4-methoxyphenoxy)-2-(3-methylphenoxy)ethane, p-methylthiophenyl benzyl ether, 1,4-di(phenylthio)butane, p-acetotoluidide, p-acetophenetidide, N-acetoacetyl-p-toluidine, di(β-biphenylethoxy)benzene, p-di(-vinyloxyethoxy)benzene, 1-isopropylphenyl-2-phenylethane, etc.

It is desired that the amount of sensitizer to be used be adjusted generally within the range of up to about 4 parts by weight per part by weight of the color acceptor although not limited specifically.

It is also possible to add a preservability improving agent for record images as required. Examples thereof are as follows.

Hindered phenol compounds, e.g., 2,2'-methylenebis(4-methyl-6-tert-butylphenol), 2,2'-methylenebis(4-ethyl-6-tert-butylphenol), 2,2'-methylenebis(4,6-di-tert-butylphenol), 2,2'-ethylenebis(4-methyl-6-tert-butylphenol), 2,2'-ethylidenebis(4,6-di-tert-butylphenol), 2,2'-ethylidenebis(4-methyl-6-tert-butylphenol), 2,2'-ethylidenebis(4-ethyl-6-tert-butylphenol), 2,2'-(2,2-propylidene)bis(4,6-di-tert-butylphenol), 2,2'-methylenebis(4-methoxy-6-tert-butylphenol), 2,2'- methylenebis(6-tert-butylphenol), 4,4'-thiobis(3-methyl-6-tert-butylphenol), 4,4'-thiobis(2-methyl-6-tert-butylphenol), 4,4'-thiobis(5-methyl-6-tert-butylphenol), 4,4'-thiobis(2-chloro-6-tert-butylphenol), 4,4'-thiobis(2-methoxy-6-tert-butylphenol), 4,4'-thiobis(2-ethyl-6-tert-butylphenol), 4,4'-butylidenebis(6-tert-butyl-m-cresol), 1-[α-methyl-α-(4'-hydroxyphenyl)ethyl]-4-[α',α'-bis(4"-hydroxyphenyl)ethyl]benzene, 1,1,3-tris(2-methyl-4-hydroxy-5-cyclohexylphenyl)butane, 1,1,3-tris(2-methyl-4-hydroxy-5-tert-butylphenyl)butane, 4,4'-thiobis(3-methylphenol), 4,4'-dihydroxy-3,3',5,5'-tetrabromodiphenylsulfone, 4 4'-dihydroxy-3,3',5 5'-tetramethyldiphenylsulfone, 2,2-bis(4-hydroxy-3,5-dibromophenyl)propane, 2,2-bis(4-hydroxy-3,5-dichlorophenyl)propane, 2,2-bis(4-hydroxy-3,5-dimethylphenyl)propane, etc.

Epoxy compounds, e.g., 1,4-diglycidyloxybenzene, 4,4'-diglycidyloxydiphenylsulfone, 4-benzyloxy-4'-(2-methylglycidyloxy)diphenylsulfone, diglycidyl terephthalate, cresol novolak type epoxy resin, phenol novolak type epoxy resin, bisphenol A type epoxy resin, etc.

N,N'-Di-2-naphthyl-p-phenylenediamine, sodium or polyvalent metal salt of 2,2'-methylenebis(4,6-di-tert-butylphenyl)phosphate, bis(4-ethyleneiminocarbonylaminophenyl)methane, etc.

Among the above preservability improving agents preferable are 2,2'-methylenebis(4-methyl-6-tert-butylphenol), 2,2'-methylenebis(4-ethyl-6-tert-butylphenol), 2,2'-ethylidenebis(4,6-di-tert-butylphenol), 4,4'-thiobis(2-methyl-6-tert-butylphenol) and 4,4'-thiobis(3-methyl-6-tert-butylphenol) which improve remarkably light resistance of record images, therefore it is preferable to use when so desired. The preservability improving agent is used in an amount of 1 to 500 parts by weight, preferably 10 to 200 parts by weight per 100 parts by weight of the basic dye.

The present heat sensitive recording material has as described above a protective layer containing microcapsules having incorporated ultraviolet absorber therein. The protective layer contains as main components microcapsules and a binder. The binder is composed of a water-soluble or water-dispersible high molecular weight compound.

Examples of useful binders are starches, hydroxyethyl cellulose, methyl cellulose, carboxymethyl cellulose, gelatin, casein, gum arabic, polyvinyl alcohol, carboxyl-modified polyvinyl alcohol, acetoacetyl-modified polyvinyl alcohol, silicon-modified polyvinyl alcohol, diisobutylene-maleic anhydride copolymer salt, styrene-maleic anhydride copolymer salt, ethylene-acrylic acid copolymer salt, styrene-acrylic acid copolymer salt, styrene-butadiene copolymer emulsion, urea resin, melamine resin, amide resin, polyurethane resin, etc. Among the above particularly preferable are acetoacetyl-modified polyvinyl alcohol, carboxyl-modified polyvinyl alcohol and silicon-modified polyvinyl alcohol which easily afford a film having excellent water resistance.

In order to improve amenability to printing and prevent sticking, pigments can be incorporated into the protective layer. Examples of useful pigments are inorganic pigments such as calcium carbonate, zinc oxide, aluminum oxide, titanium dioxide, silicon dioxide, aluminum hydroxide, barium sulfate, zinc sulfate, talc, kaolin, clay, calcined kaolin and colloidal silica, and organic pigments such as styrene microballs, nylon powder, polyethylene powder, urea-formalin resin filler and raw starch particles. Generally, such a pigment is used preferably in an adjusted amount of about 5 to about 300 parts by weight per 100 parts by weight of the binder.

The method of preparing the coating composition for the protective layer is not particularly limited and the above specific microcapsule (dispersion), binder and as required pigment are dispersed into water serving as a dispersion medium.

Further when required, various auxiliary agents can be incorporated into the coating composition for forming the protective layer. Examples of suitable agents are lubricants such as zinc stearate, calcium stearate, polyethylene wax, carnauba wax, paraffin wax and ester wax, surfactants (dispersant, wetting agent) such as sodium dioctylsulfosuccinate, defoaming agents, water-soluble polyvalent metal salts such as potassium alum and aluminum acetate, etc. Also usable are curing agents, such as glyoxal, boric acid, dialdehyde starch and epoxy compounds, for giving improved water-resistance to the layer.

The heat sensitive recording layer or protective layer can be formed by a method which is not limited specifically, for example, by applying a coating composition for the heat sensitive recording layer to the substrate and by applying a coating composition for the protective layer to the recording layer, by a suitable method such as air knife coating, varibar blade coating, pure blade coating, rod blade coating, short-dwell coating, curtain coating or die coating, and drying the resulting respective coating. The substrate is suitably selected from paper, plastics film, synthetic paper, non-woven fabric, metal-deposited material and the like. The amount of coating composition for the recording layer is adjusted usually to the range of 2 to 12 g/m$^2$, preferably about 3 to about 10 g/m$^2$, in dry weight.

The amount of coating composition for the protective layer is adjusted usually to the range of 0.1 to 20 g/m$^2$, preferably about 0.5 to about 10 g/m$^2$, in dry weight.

Further, it is possible to form as required a protective layer containing a binder and optionally a pigment on the rear surface of the heat sensitive recording material to give improved preservability of record images. Incidentally, various techniques already known in the art of preparing heat sensitive recording materials can be additionally resorted to. For example, an undercoat layer can be formed on the substrate, or the recording material formed with each layer can be treated by supercalendering to smooth the surface. Further, it is possible to form an adhesive layer on the rear surface of the recording material to obtain an adhesive label, to form a magnetic recording layer, pigment-coated layer for printing or thermal dye-transfer recording layer on the rear surface of the recording material.

In the present heat sensitive recording material, it is desirable to provide the protective layer surface with smoothness treatment which improves the color forming sensitivity and the quality of record images. It is preferable to conduct the treatment to give the surface Bekk Smoothness (JIS P 8119) of at least 300 seconds, preferably at least 500 seconds. As a device for smoothness treatment is used a supercalender or glosscalender using a combination of an elastic roll and metal roll, etc. In order to prevent rupture of microcapsules incorporated in the protective layer, it is desirable to use an elastic roll having Shore D hardness defined in ASTM D-2240 of 60° to 90°, preferably 70° to 90°. The nip pressure at the treatment should be determined suitably according to the hardness of elastic roll and desired smoothness, and is adjusted preferably to 30 to 300 kg/cm.

The elastic layer of the elastic roll is made from natural rubber, styrene rubber, nitrile rubber, chloroprene rubber, chlorosulfonated ethylene rubber, butyl rubber, polysulfide rubber, silicon rubber, fluorinated rubber, urethane rubber and like rubbers, various plastics resins, cotton, paper, wool, polyethylene terephthalate, nylon, or a mixture of these materials. Examples of metal rolls are chilled roll, alloy chilled roll, steel roll, metal roll having hard chromium-plated surface, etc.

The present invention will be described in greater detail with reference to the following examples, to which the invention is of course not limited.

The parts and percentages in these examples are all by weight unless otherwise specified.

EXAMPLE 1

(1) Composition (A)

To a vessel equipped with a heater was added 60 parts of 8% aqueous solution of polyvinyl alcohol (brand name: PVA-217, product of Kuraray Co., Ltd.) to obtain an aqueous medium for microencapsulation.

Separately, in 12,parts of tricresyl phosphate were disolved 2 parts of 2-(2'-hydroxy-5'-methylphenyl)benzotriazole and 18 parts of an adduct of xyiylenediisocyanate and trimethylolpropane (3:1) (brand name: Takenate D-110N, product of Takeda Chemical Ind. Ltd., ethyl acetate content: 25%). The solution was emulsified with cooling in the above aqueous medium by use of homomixer (brand name: TK homomixer Model HV-M, product of Tokushu Kika Kogyo KK) to prepare an emulsion containing particles 2 μm in average size.

To the emulsion was added 50 parts of water and the mixture was reacted at 60° C. for 3 hours with stirring to obtain a capsule dispersion containing a ultraviolet absorber and having a capsule wall film of a polyurethane-polyurea resin.

(2) Composition (B)

3-(N-Ethyl-N-isoamyl)amino-6-methyl-7-anilinofluoran (10 parts), 5 parts of 5% aqueous solution of methyl cellulose and 40 parts of water were pulverized to a mean particle size of 3 μm by a sand mill to obtain Composition (B).

(3) Composition (C)

4-Hydroxy-4'-isopropoxydiphenylsulfone (30 parts), 5 parts of 5 % aqueous solution of methyl cellulose and 80 parts of water were pulverized to a mean particle size of 3 μm by a sand mill to obtain Composition (C). (4) Composition (D)

1,2-Di(3-methylphenoxy) ethane (20 parts), 5 parts of 5% aqueous solution of methyl cellulose and 55 parts of water were pulverized to a mean particle size of 3 μm by a sand mill to obtain Composition (D). (5) Formation of recording layer A coating composition for a recording layer prepared by mixing together 55 parts of the composition B, 115 parts of the composition C,. 80 parts of the composition D, 80 parts of 10% aqueous solution of polyvinyl alcohol and35 parts of calcium carbonate with stirring was applied to one surface of a wood-free paper weighing 60 g/m² in an amount of 6 g/m² when dried, followed by drying to form a heat sensitive recording layer.

(6) Formation of protective layer

A coating composition for a protective layer was prepared by mixing together 220 parts of the composition A, 150 parts of 10% aqueous solution of acetoacetyl-modified polyvinyl alcohol (brand name: Gohsefimer Z-200, product of The Nippon Synthetic Chemical Ind. Co., Ltd.), 15 parts of kaolin (brand name: UW-90, product of Engelhard Minerals & Chemicals Corp.), 6 parts of 30% aqueous dispersion of zinc stearate and 30 parts of water with stirring.

The coating composition was applied to the above recording layer in an amount of 6 g/m² when dried, followed by drying and supercalendering with use of a new-cotton roll of 85° in Shore D hardness as an elastic roll at conditions of 60 kg/cm in nip pressure and 2 in nip number to obtain a heat sensitive recording paper which has protective layer surface of 1200 seconds in Bekk smoothness.

EXAMPLE 2

A heat sensitive recording paper was prepared in the same manner as in Example 1 except that, in the preparation of composition A 2 parts of 2-[2'-hydroxy-3',5'-bis(α,α-dimethylbenzyl)phenyl]benzotriazole was used in place of 2 parts of 2-(2'-hydroxy-5'-methylphenyl)-benzotriazole.

EXAMPLE 3

A heat sensitive recording paper was prepared in the same manner as in Example 1 except that, in the preparation of composition A, 2 parts of 2-(2'-hydroxy-3',5'-di-tert-butylphenyl)benzotriazole was used in place of 2 parts of 2-(2'-hydroxy-5'-methylphenyl)benzotriazole.

EXAMPLE 4

A heat sensitive recording paper was prepared in the same manner as in Example 1 except that, in the preparation of composition A, 2 parts of 2-(2'-hydroxy-3'-tert-butyl-5'-methylphenyl)-5-chlorobenzotriazole was used in place of 2 parts of 2-(2'-hydroxy-5'-methylphenyl)benzotriazole.

EXAMPLE 5

A heat sensitive recording paper was prepared in the same manner as in Example 1 except that, in the preparation of composition A, 2 parts of 2-(2'-hydroxy-3',5'-di-tert-butylphenyl)-5-chlorobenzotriazole was used in place of 2 parts of 2-(2'-nydroxy-5'-methylphenyl)benzotriazole.

EXAMPLE 6

A heat sensitive recording paper was prepared in the same manner as in Example 1 except that, in the preparation of composition A, 2 parts of 2-(2'-hydroxy-3',5'-di-tert-amylphenyl)benzotriazole was used in place of 2 parts of 2-(2'-hydroxy-5'-methylphenyl)benzotriazole.

EXAMPLE 7

(1) Composition (E)

A coating composition for an undercoat layer was prepared by mixing together 100 parts of calcined clay (brand name: Ansilex, product of Engelhard Minerals & Chemicals Corp., oil absorption: 110 ml/100 g), 100 parts of 10% aqueous solution of polyvinyl alcohol and 200 parts of water. (2) Preparation of heat sensitive recording paper To one surface of a wood-free paper weighing 60 g/m² was applied the composition E in an amount of 7 g/m² when dried, followed by drying to obtain an undercoat layer. To the layer were applied the coating composition for recording layer and the coating composition for protective layer each used in Example 1 each in an amount of 6 g/m² when dried, followed by drying and supercalendering in the same manner as in Example 1 to obtain a heat sensitive recording paper which has protective layer surface of 2500 seconds in Bekk Smoothness.

EXAMPLE 8

A heat sensitive recording paper was prepared in the same manner as in Example 1 except that, in the preparation of composition C, 30 parts of bis(4-hydroxyphenylthioethoxy)methane was used in place of 30 parts of 4-hydroxy-4'-isopropoxydiphenylsulfone, and in the preparation of composition D, 20 parts of bis(4-hydroxyphenylthioethoxy)methane was used in place of 20 parts of 1,2-di(3-methylphenoxy) ethane.

EXAMPLE 9

A heat sensitive recording paper was prepared in the same manner as in Example 1 except that, in the preparation of composition D, 20 parts of 2-naphthyl benzyl ether was used in place of 20 parts of 1,2-di(3-methylphenoxy)ethane.

EXAMPLE 10

A heat sensitive recording paper was prepared in the same manner as in Example 1 except that, in the formation of protective layer, 150 parts of 10% aqueous solution of carboxyl-modified polyvinyl alcohol (brand name: KL-318, product of Kuraray Co., Ltd.) was used in place of 150 parts of 10% aqueous solution of acetoacetyl-modified polyvinyl alcohol, and 15 parts of calcium carbonate was used in place of 15 parts of kaolin.

EXAMPLE 11

A heat sensitive recording paper was prepared in the same manner as in Example 1 except that, in the preparation of composition A, the amount of the adduct of xylylene-diisocyanate and trimethylolpropane (3:1) (ethyl acetate content: 25% ) was changed to 8parts from 18 parts, and the amount of 2-(2'-hydroxy-5'-methylphenyl)benzotriazole was changed to 1.4 parts from 2 parts.

EXAMPLE 12

A heat sensitive recording paper was prepared in the same manner as in Example I except that, in the preparation of composition A, the amount of the 2-(2'-hydroxy-5'-methylphenyl)benzotriazole was changed to 0.5 part from 2 parts.

EXAMPLE 13

(1) Composition (F)

To a vessel equipped with a heater was added 150 parts of 5% aqueous solution of polyacrylic acid and the pH was adjusted to 4.5 to obtain an aqueous medium for microencapsulation.

Separately, in 100 parts of tricresyl phosphate was disolved 16 parts of 2-(2'-hydroxy-5'-methylphenyl)-benzotriazole to obtain a solution of a capsule core material. The solution was emulsified at 10000 rpm for 15 minutes with cooling in the above aqueous medium by use of homomixer (brand name: TK homomixer Model HV-M) to prepare an emulsion.

To the emulsion was added 190 parts of 30% aqueous solution of commercial melamine-formaldehyde precondensate and the mixture was reacted at 90° for 3 hours with stirring and then cooled to obtain a capsule dispersion containing a ultraviolet absorber and having a capsule wall film of a melamine-formaldehyde resin. The capsule dispersion contained particles 2 μm in average size.

(2) Preparation of heat sensitive recording paper

A coating composition for a protective layer was prepared by mixing together 55 parts of the composition F, 150 parts of 10% aqueous solution of acetoacetyl-modified polyvinyl alcohol (brand name: Gohsefimer Z-200), 15 parts of kaolin (brand name: UW-90), 6 parts of 30% aqueous dispersion of zinc stearate and 30 parts of water with stirring.

A heat sensitive recording paper was prepared in the same manner as in Example 1 with the exception of using the above coating composition for the protective layer. The Bekk smoothness of the protective layer surface was 1200 seconds.

Comparison Example 1

A heat sensitive recording paper was prepared in the same manner as in Example 1 except that, in the preparation of the composition A, 2-(2'-hydroxy-5'-methylphenyl)benzotriazole was not used. The Bekk smoothness of the protective layer surface was 1200 seconds.

Comparison Example 2

(1) Composition (G)

2-(2'-Hydroxy-5'-methylphenyl)benzotriazole (10 parts), 5 parts of 5% aqueous solution of methyl cellulose and 40 parts of water were pulverized to a mean particle size of 3 μm by a sand mill to obtain Composition (G).

(2) Preparation of heat sensitive recording paper

A heat sensitive recording paper was prepared in the same manner as in Example 1 except that, in the preparation of the protective layer, 40 parts of the composition G was used in place of 220 parts of the composition A. The Bekk smoothness of the protective layer surface was 900 seconds.

Comparison Example 3

A heat sensitive recording paper was prepared in the same manner as in Comparison Example 2 except that, in the preparation of the composition G, 10 parts of 2-(2'-hydroxy-3',5'-di-tert-amylphenyl)benzotriazole was used in place of 10 parts of 2-(2'-hydroxy-5'-methylphenyl)benzotriazole.

The 16 kinds of heat sensitive recording papers thus obtained were tested for the following properties. Table 1 shows the results.

1. Color forming property

Each recording paper was caused to produce color images thereon using a tester for heat sensitive recording materials (brand name: TH-PMD, product of Oh-kura Denki Co., Ltd.) at an applied-voltage of 24 V with a pulse width of 2 ms. The density of images recorded was measured by a Macbeth densitometer (Model RD-914, product of Macbeth Corp.) in a visual mode.

2. Light resistance

The heat sensitive recording paper tested by the foregoing procedure I was exposed directly to sunlight for 2 days, and the density of the background area was thereafter measured by the Macbeth densitometer (using a blue filter).

3. Plasticizer resistance

The heat sensitive recording paper having the images recorded thereon by the procedure 1 was tested for plasticizer resistance by winding a wrap film (brand name: KMA-W, product of Mitsui Toatsu Chemicals Inc.) around a polycarbonate pipe (40 mm in diameter) in three lapping layers, placing the recording paper over the lapping layers, further winding the wrap film around the recording paper in three lapping layers, allowing the resulting winding to stand at 20° C. for 24 hours and thereafter measuring the color density of the recorded images by the Macbeth densitometer (in a visual mode).

4. Resistance to high temperature and high humidity

The heat sensitive recording paper having the images recorded thereon by the procedure 1 was allowed to stand in an atmosphere of 50° and RH 95% for 24 hours, and the color density of the recorded images and the density of the background area were thereafter measured by the Macbeth densitometer (in a visual mode) for the evaluation of resistance to high temperature and high humidity.

5. Solvent resistance

The surface of the heat sensitive recording paper before recording was wiped with gauze wet with ethanol, and the density of resulting fog was measured by the Macbeth densitometer (in a visual mode) for the evaluation of solvent resistance.

absorber and having a capsule wall film of a polyurethane-polyurea resin.

(2) Composition (I)

3-Di(n-butyl)amino-6-methyl-7-anilinofluoran (10 parts), 5 parts of 5% aqueous solution of methyl cellulose and 40 parts of water were pulverized to a mean particle size of 3 μm by a sand mill to obtain Composition (I).

(3) Composition (J)

4-Hydroxy-4'-isopropoxydiphenylsulfone (30 parts), 5 parts of 5% aqueous solution of methyl cellulose and 80 parts of water were pulverized to a mean particle size of 3 μm by a sand mill to obtain Composition (J).

(4) Composition (K)

1,2-Di(3-methylphenoxy)ethane (20 parts), 5 parts of 5% aqueous solution of methyl cellulose and 55 parts of water were pulverized to a mean particle size of 3 μm by a sand mill to obtain Composition (K).

(5) Formation of recording layer

A coating composition for a recording layer prepared by mixing together 55 parts of the composition I, 115 parts of the composition J, 80 parts of the composition K, 80 parts of 10% aqueous solution of polyvinyl alcohol and 35 parts of calcium carbonate with stirring was applied to one surface of a wood-free paper weighing 60 g/m² in an amount of 6 g/m² when dried, followed by drying to form a heat sensitive recording layer.

TABLE 1

| | amount of UV absorber (g/m²) | color forming ability | light resistance | plasticizer resistance | high-temp. and high-humidity resistance | | solvent resistance |
| --- | --- | --- | --- | --- | --- | --- | --- |
| | | | | | record image | background | |
| Ex. 1 | 0.21 | 1.26 | 0.12 | 1.21 | 1.24 | 0.13 | 0.08 |
| Ex. 2 | 0.21 | 1.25 | 0.17 | 1.20 | 1.24 | 0.12 | 0.07 |
| Ex. 3 | 0.21 | 1.25 | 0.11 | 1.19 | 1.22 | 0.15 | 0.09 |
| Ex. 4 | 0.21 | 1.24 | 0.13 | 1.20 | 1.21 | 0.16 | 0.11 |
| Ex. 5 | 0.21 | 1.25 | 0.17 | 1.22 | 1.23 | 0.16 | 0.09 |
| Ex. 6 | 0.21 | 1.24 | 0.16 | 1.18 | 1.23 | 0.15 | 0.06 |
| Ex. 7 | 0.21 | 1.27 | 0.09 | 1.25 | 1.26 | 0.10 | 0.09 |
| Ex. 8 | 0.21 | 1.23 | 0.15 | 1.16 | 1.20 | 0.18 | 0.12 |
| Ex. 9 | 0.21 | 1.26 | 0.13 | 1.22 | 1.23 | 0.19 | 0.08 |
| Ex. 10 | 0.21 | 1.25 | 0.11 | 1.14 | 1.22 | 0.14 | 0.08 |
| Ex. 11 | 0.21 | 1.26 | 0.12 | 1.10 | 1.09 | 0.25 | 0.08 |
| Ex. 12 | 0.05 | 1.26 | 0.18 | 1.21 | 1.21 | 0.13 | 0.09 |
| Ex. 13 | 0.22 | 1.25 | 0.12 | 1.21 | 1.24 | 0.13 | 0.08 |
| Com. Ex. 1 | — | 1.25 | 0.40 | 1.21 | 1.01 | 0.14 | 0.08 |
| Com. Ex. 2 | 1.11 | 1.21 | 0.28 | 0.33 | 0.89 | 0.35 | 0.60 |
| Com. Ex. 3 | 1.11 | 1.20 | 0.34 | 0.24 | 0.80 | 0.47 | 0.81 |

EXAMPLE 14

(1) Composition (H)

To a vessel equipped with a heater was added 60 parts of 8% aqueous solution of polyvinyl alcohol (brand name: PVA-217, product of Kuraray Co., Ltd.) to obtain an aqueous medium for microencapsulation.

Separately, 3 parts of ethyl acetate, 12 parts of 2-(2'-hydroxy-3'-dodecyl-5'-methylphenyl)benzotriazole and 18 parts of an adduct of xylylene diisocyanate and trimethylolpropane (3:1) (brand name: Takenate D-110N, product of Takeda Chemical Ind. Ltd., ethyl acetate content: 25% ) were mixed to obtain a solution of a capsule core material and capsule wall-forming material. The solution was emulsified with cooling in the above aqueous medium by use of homomixer (brand name: TK homomixer Model HV-M, product of Tokushu Kika Kogyo KK) to prepare an emulsion containing particles 2 μm in average size.

To the emulsion was added 50 parts of water and the mixture was reacted at 60° C. for 3 hours with stirring to obtain a capsule dispersion containing a ultraviolet (6) Formation of protective layer A coating composition for a protective layer was prepared by mixing together 2.20 parts of the composition H, 150 parts of 10% aqueous solution of acetoacetyl-modified polyvinyl alcohol (brand name: Gohsefimer Z-200, product of The Nippon Synthetic Chemical Ind. Co., Ltd), 15 parts of kaolin (brand name: UW-90, product of Engelhard Minerals & Chemicals Corp.), 6 parts of 30% aqueous dispersion of zinc stearate and 30 parts of water with stirring.

The coating composition was applied to the above recording layer in an amount of 6 g/m² when dried, followed by drying and supercalendering with use of a new-cotton roll of 85° in Shore D hardness as an elastic roll at conditions of 60 kg/cm in nip pressure and 2 in nip number to obtain a heat sensitive recording paper which has protective layer surface of 1200 seconds in Bekk smoothness.

EXAMPLE 15

A heat sensitive recording paper was prepared in the same manner as in Example 14 except that, in the preparation of composition H, 12 parts of 2-[2'-hydroxy-4'-(2''-ethylhexyl)oxyphenyl]benzotriazole was used in place of 12 parts of 2-(2'-hydroxy-3'-dodecyl-5'-methylphenyl)benzotriazole.

EXAMPLE 16

A heat sensitive recording paper was prepared in the same manner as in Example 14 except that, in the preparation of composition H, 12 parts of octyl 5-tert-butyl-3-(5-chloro-2H-benzotriazole-2-yl)-4-hydroxybenzenepropionate was used in place of 12 parts of 2-(2'-hydroxy-3'-dodecyl-5'-methylphenyl)benzotriazole.

EXAMPLE 17

A heat sensitive recording paper was prepared in the same manner as in Example 14 except that, in the preparation of composition H, 3 parts of 1-phenyl-1-methyl-1-xylylmethane was used in place of 3 parts of ethyl acetate, 6 parts of 2-(2'-hydroxy-3'-dodecyl-5'-methylphenyl)benzotriazole and 6 parts of a condensate of methyl 3-[3-tert-butyl-5-(2H-benzotriazole-2-yl)-4-hydroxyphenyl]propionate and polyethylene glycol (molecular weight: about 300) were used in place of 12 parts of 2-(2'-hydroxy-3'-dodecyl-5'-methylphenyl)benzotriazole.

EXAMPLE 18

(1) Composition (L)

A coating composition for an undercoat layer was prepared by mixing together 100 parts of calcined clay (brand name: Ansilex, product of Engelhard Minerals & Chemicals Corp., oil absorption: 110 ml/100 g), 100 parts of 10% aqueous solution of polyvinyl alcohol and 200 parts of water.

(2) Preparation of heat sensitive recording paper

To one surface of a wood-free paper weighing 60 g/m² was applied the composition L in an amount of 7 g/m² when dried, followed by drying to obtain an undercoat layer. To the layer were applied the coating composition for recording layer and the coating composition for protective layer each used in Example 14 each in an amount of 6 g/m² when dried, followed by drying and supercalendering in the same manner as in Example 14 to obtain a heat sensitive recording paper which has protective layer surface of 2500 seconds in Bekk Smoothness.

EXAMPLE 19

A heat sensitive recording paper was prepared in the same manner as in Example 14 except that, in the preparation of composition J, 30 parts of bis(4-hydroxyphenylthioethoxy)methane was used in place of 30 parts of 4-hydroxy-4'-isopropoxydiphenylsulfone, and in the preparation of composition K, 20 parts of bis(4-hydroxyphenylthioethoxy)-methane was used in place of 20 parts of 1,2-di(3-methylphenoxy)ethane.

EXAMPLE 20

A heat sensitive recording paper was prepared in the same manner as in Example 14 except that, in the preparation of composition K, 20 parts of 2-naphthyl benzyl ether was used in place of 20 parts of 1,2-di(3-methylphenoxy)ethane.

EXAMPLE 21

A heat sensitive recording paper was prepared in the same manner as in Example 14 except that, in the formation of protective layer, 150 parts of 10% aqueous solution of carboxyl-modified polyvinyl alcohol (brand name: KL-318, product of Kuraray Co., Ltd.) was used in place of 150 parts of 10% aqueous solution of acetoacetyl-modified polyvinyl alcohol, and 15 parts of calcium carbonate was used in place of 15 parts of kaolin.

EXAMPLE 22

A heat sensitive recording paper was prepared in the same manner as in Example 14 except that, in the preparation of composition H, the amount of the adduct of xylylene diisocyanate and trimethylolpropane (3:1) (ethyl acetate content: 25 wt. %) was changed to 8 parts from 18 parts.

EXAMPLE 23

A heat sensitive recording paper was prepared in the same manner as in Example 14 except that, in the preparation of composition H, the amount of the 2-(2'-hydroxy-3'-dodecyl-5'-methylphenyl)benzotriazole was changed to 3 parts from 12 parts, and 12 parts of diisopropylnaphthalene was used in place of 3 parts of ethyl acetate.

Comparison Example 4

A heat sensitive recording paper was prepared in the same manner as in Example 14 except that, in the preparation of composition H, 12 parts of diisopropylnaphthalene was used in place of 12 parts of 2-(2'-hydroxy-3'-dodecyl-5'-methylphenyl)benzotriazole. The Bekk smoothness of the protective layer surface was 1200 seconds.

Comparison Example 5

(1) Composition (M)

2-(2'-Hydroxy-5'-methylphenyl)benzotriazole (10 parts), 5 parts of 5% aqueous solution of methyl cellulose and 40 parts of water were pulverized to a mean particle size of 3 μm by a sand mill to obtain Composition (M).

(2) Preparation of heat sensitive recording paper

A heat sensitive recording paper was prepared in the same manner as in Example 14 except that, in the preparation of the protective layer, 45 parts of the composition M was used in place of 220 parts of the composition H. The Bekk smoothness of the protective layer surface was 900 seconds. Comparison Example 6

A heat sensitive recording paper was prepared in the same manner as in Comparison Example 5 except that, in the preparation of the composition M, 10 parts of 2-(2'-hydroxy-3',5'-di-tert-amylphenyl)benzotriazole was used in place of 10 parts of 2-(2'-hydroxy-5'-methylphenyl)benzotriazole.

The 13 kinds of heat sensitive recording papers thus obtained were tested for the following properties. Table 2 shows the results.

1. Color forming property

Each recording paper was caused to produce color images thereon using a tester for heat sensitive recording materials (brand name: TH-PMD, product of Ohkura Denki Co., Ltd.) at an applied-voltage of 24 V with a pulse width of 2 ms. The density of images recorded was measured by a Macbeth densitometer (Model RD-914, product of Macbeth Corp.) in a visual mode.

2. Light resistance

The heat sensitive recording paper tested by the foregoing procedure 1 was exposed directly to sunlight for 7 days, and the density of the background area was thereafter measured by the Macbeth densitometer (using a blue filter).

3. Plasticizer resistance

The heat sensitive recording paper having the images recorded thereon by the procedure 1 was tested for plasticizer resistance by winding a wrap film (brand name: KMA-W, product of Mitsui Toatsu Chemicals Inc.) around a polycarbonate pipe (40 mm in diameter) in three lapping layers, placing the recording paper over the lapping layers, further winding the wrap film around the recording paper in three lapping layers, allowing the resulting winding to stand at 20° C. for 24 hours and thereafter measuring the color density of the recorded images for the evaluation of plasticizer resistance.

4. Resistance to high temperature and high humidity

The heat sensitive recording paper having the images recorded thereon by the procedure 1 was allowed to stand in an atmosphere of 50° C. and RH 75% for 24 hours, and the color density of the recorded images and the density of the background area were thereafter measured for the evaluation of resistance to high temperature and high humidity.

5. Solvent resistance

The surface of the heat sensitive recording paper before recording was wiped with gauze wet with ethanol, and the density of resulting fog was measured for the evaluation of solvent resistance.

To the emulsion was added 175 parts of water and the mixture was reacted at 90° C. for 5 hours with stirring to obtain a capsule dispersion containing a ultraviolet absorber and having a capsule wall film of a polyurethane-polyurea resin.

(2) Formation of recording layer

A heat sensitive recording paper was prepared in the same manner as in Example 14 with use of the compositions I, J and K prepared in Example 14.

(3) Formation of protective layer

A heat sensitive recording paper which has protective layer was prepared in the same manner as in Example 14 except that, in the preparation of the protective layer, 220 parts of the composition N was used in place of 220 parts of the composition H. The Bekk smoothness of the protective layer surface was 1200 seconds.

EXAMPLE 25

A heat sensitive recording paper was prepared in the same manner as in Example 24 except that, in the preparation of the composition N, 33 parts of an isocyanate compound having Brookfield viscosity of 800 cps (brand name: Takenate D-175HN, product of Takeda Chemical Ind. Ltd.) was used in place of 33 parts of the isocyanate compound having Brookfield viscosity of 600 cps. Takenate D-175HN is isocyanate compound containing as a main component isocyanurate type trimer of hexamethylene diisocyanate.

TABLE 2

|  | UV absorber in protective layer (g/m$^2$) | color forming ability | light resistance | plasticizer resistance | high-temp. and high-humidity resistance | | solvent resistance |
|---|---|---|---|---|---|---|---|
|  |  |  |  |  | record image | background |  |
| Ex. 14 | 1.2 | 1.26 | 0.10 | 1.18 | 1.20 | 0.12 | 0.10 |
| Ex. 15 | 1.2 | 1.25 | 0.10 | 1.19 | 1.20 | 0.12 | 0.10 |
| Ex. 16 | 1.2 | 1.25 | 0.10 | 1.15 | 1.20 | 0.12 | 0.10 |
| Ex. 17 | 1.2 | 1.24 | 0.10 | 1.19 | 1.20 | 0.12 | 0.10 |
| Ex. 18 | 1.2 | 1.29 | 0.09 | 1.23 | 1.23 | 0.10 | 0.08 |
| Ex. 19 | 1.2 | 1.24 | 0.14 | 1.17 | 1.18 | 0.13 | 0.10 |
| Ex. 20 | 1.2 | 1.27 | 0.13 | 1.20 | 1.22 | 0.13 | 0.10 |
| Ex. 21 | 1.2 | 1.25 | 0.10 | 1.17 | 1.19 | 0.12 | 0.11 |
| Ex. 22 | 1.4 | 1.24 | 0.10 | 1.09 | 1.02 | 0.16 | 0.11 |
| Ex. 23 | 0.2 | 1.26 | 0.20 | 1.18 | 1.20 | 0.12 | 0.10 |
| Com. Ex. 4 | — | 1.26 | 0.60 | 1.17 | 1.20 | 0.13 | 0.10 |
| Com. Ex. 5 | 1.2 | 1.20 | 0.50 | 0.35 | 0.82 | 0.31 | 0,62 |
| Com. Ex. 6 | 1.2 | 1.17 | 0.54 | 0.22 | 0.81 | 0.45 | 0.78 |

EXAMPLE 24

(1) Composition (N)

To a vessel equipped with a heater was added 220 parts of 12% aqueous solution of a partially saponified acetoacetyl-modified polyvinyl alcohol (brand name: Gohsefimer Z-210, product of The Nippon Synthetic Chemical Ind. Co., Ltd.) to obtain an aqueous medium for microencapsulation.

Separately, 77 parts of 2-(2'-hydroxy-3'-dodecyl-5'-methylphenyl)benzotriazole and 33 parts of an isocyanate compound (brand name: Takenate D-170HN, product of Takeda Chemical Ind. Ltd.) were mixed with heating at 40° C. to obtain a solution. Takenate D-170HN is isocyanate compound having a viscosity of 600 cps as determined by a Brookfield type viscometer at 25° C. and containing as a main component isocyanurate type trimer of hexamethylene diisocyanate. The solution was emulsified with cooling in the above aqueous medium by use of homomixer (brand name: TK homomixer Model HV-M, product of Tokushu Kika Kogyo KK) to prepare an emulsion containing particles 2 μm in average size.

EXAMPLE 26

A heat sensitive recording paper was prepared in the same manner as in Example 24 except that, in the preparation of the composition N, 33 parts of an isocyanate compound having Brookfield viscosity of 260 cps (brand name: Takenate D-177N, product of Takeda Chemical Ind. Ltd.) was used in place of 33 parts of the isocyanate compound having Brookfield viscosity of 600 cps. Takenate D-177N is isocyanate compound containing as a main component isocyanurate type trimer of hexamethylene diisocyanate.

EXAMPLE 27

A heat sensitive recording paper was prepared in the same manner as in Example 24 except that, in the preparation of the composition N, 33 parts of an isocyanate compound having Brookfield viscosity of 240 cps (brand name: Desmodur TPLS 2550, product of Sumitomo Bayer Urethane Co., Ltd.) was used in place of 33 parts of the isocyanate compound having Brookfield viscosity of 600 cps. Desmodur TPLS 2550 is isocyanate compound containing as a main component isocyanurate type trimer of hexamethylene diisocyanate.

EXAMPLE 28

A heat sensitive recording paper was prepared in the same manner as in Example 24 except that, in the preparation of the composition J, 30 parts of 4,4'-isopropylidenediphenol was used in place of 30 parts of 4-hydroxy-4'-isopropoxydiphenylsulfone.

EXAMPLE 29

A heat sensitive recording paper was prepared in the same manner as in Example 24 except that, in the preparation of the composition J, 30 parts of 1,1-bis(4-hydroxyphenyl)cyclohexane was used in place of 30 parts of 4-hydroxy-4'-isopropoxydiphenylsulfone.

EXAMPLE 30

A heat sensitive recording paper was prepared in the same manner as in Example 24 except that, in the preparation of the composition I, 10 parts of 3-di(n-butyl)amino-7-(o-chlorophenylamino)fluoran was used in place of 10 parts of 3-di(n-butyl)amino-6-methyl-7-anilinofluoran, and in the preparation of the composition J, 30 parts of 1,1-bis(4-hydroxyphenyl)cyclohexane was used in place of 30 parts of 4-hydroxy-4'-isopropoxydiphenylsulfone.

EXAMPLE 31

A heat sensitive recording paper was prepared in the same manner as in Example 24 except that, in the preparation of the composition I, 10 parts of 3-diethylamino-7-(m-trifluoromethylphenylamino)fluoran was used in place of 10 parts of 3-di(n-butyl)amino-6-methyl-7-anilinofluoran.

EXAMPLE 32

(1) Composition (O)

2,2'-Methylenebis(4-methyl-6-tert-butylphenol) (10 parts), 5 parts of 5% aqueous solution of methyl cellulose and 40 parts of water were pulverized to a mean particle size of 3 μm by a sand mill to obtain Composition (O).

(2) Formation of recording layer

A heat sensitive recording paper was prepared in the same manner as in Example 24 in the formation of the recording layer, with the exception of using a coating composition in which 30 parts of the above composition (O) was further added.

(3) Formation of protective layer

A heat sensitive recording paper was prepared in the same manner as in Example 24 in the formation of the protective layer, with the exception of using the above heat sensitive recording paper.

The 9 kinds of heat sensitive recording papers thus obtained were tested for the following properties. Table 3 shows the results.

1. Color forming property

Each recording paper was caused to produce color images thereon using a tester for heat sensitive recording materials (brand name: TH-PMD, product of Ohkura Denki Co., Ltd.) at an energy of 0.4 mJ/dot. The density of images recorded was measured by a Macbeth densitometer (Model RD-914, product of Macbeth Corp.) in a visual mode.

2. Light resistance

The heat sensitive recording paper tested by the foregoing procedure 1 was exposed directly to sunlight for 10 days, and each density of the background area before and after exposure was measured by the Macbeth densitometer (using a blue filter).

3. Plasticizer resistance

The heat sensitive recording paper having the images recorded thereon by the procedure 1 was tested for plasticizer resistance by winding a wrap film (brand name: KMA-W, product of Mitsui Toatsu Chemicals Inc.) around a polycarbonate pipe (40 mm in diameter) in three lapping layers, placing the recording paper over the lapping layers, further winding the wrap film around the recording paper in three lapping layers, allowing the resulting winding to stand at 40° C. for 24 hours and thereafter measuring the color density of the recorded images by the Macbeth densitometer (in a visual mode) for the evaluation of plasticizer resistance.

4. Resistance to high temperature and high humidity

The heat sensitive recording paper having the images recorded thereon by the procedure 1 was allowed to stand in an atmosphere of 50° C. and RH 75% for 24 hours, and the color density of the recorded images and the density of the background area were thereafter measured by the Macbeth densitometer (in a visual mode). for the evaluation of resistance to high temperature and high humidity.

5. Solvent resistance

The surface of the heat sensitive recording paper before recording was wiped with gauze wet with ethanol, and the density of resulting fog was measured by the Macbeth densitometer (in a visual mode) for the evaluation of solvent resistance.

TABLE 3

| | color forming ability | light resistance | | plasticizer resistance | high-temp. and high-humidity resistance | | solvent resistance |
| --- | --- | --- | --- | --- | --- | --- | --- |
| | | before exposure | after exposure | | record image | background | |
| Ex. 24 | 1.30 | 0.07 | 0.10 | 1.25 | 1.23 | 0.12 | 0.10 |
| Ex. 25 | 1.29 | 0.07 | 0.10 | 1.25 | 1.24 | 0.12 | 0.10 |
| Ex. 26 | 1.37 | 0.07 | 0.10 | 1.23 | 1.15 | 0.15 | 0.17 |
| Ex. 27 | 1.37 | 0.07 | 0.09 | 1.23 | 1.17 | 0.14 | 0.15 |
| Ex. 28 | 1.34 | 0.08 | 0.14 | 1.17 | 1.20 | 0.13 | 0.14 |
| Ex. 29 | 1.27 | 0.07 | 0.09 | 1.19 | 1.18 | 0.12 | 0.11 |
| Ex. 30 | 1.24 | 0.05 | 0.06 | 1.12 | 1.05 | 0.08 | 0.08 |
| Ex. 31 | 1.30 | 0.06 | 0.07 | 1.25 | 1.20 | 0.10 | 0.08 |
| Ex. 32 | 1.25 | 0.10 | 0.13 | 1.22 | 1.20 | 0.16 | 0.10 |

EXAMPLE 33

A coating composition was prepared by mixing together 220 parts of the composition A obtained in Example 1, 150 parts of 10% aqueous solution of acetoacetyl-modified polyvinyl alcohol (brand name: Gohsefimer Z-200, product of The Nippon Synthetic Chemical Ind. Co., Ltd.) and 0.3 part of 40% aqueous solution of glyoxal. The coating composition was applied to a clay-coated paper having previously yellow ink printed thereon by an off-set printing in an amount of 3 g/m² by dry weight, followed by drying to obtain a test paper.

EXAMPLE 34

A test paper was prepared in the same manner as in Example 33 except that 55 parts of the composition F prepared in Example 13 was used in place of 220 parts of the composition A.

EXAMPLE 35

A test paper was prepared in the same manner as in Example 33 except that 220 parts of the composition H prepared in Example 14 was used in place of 220 parts of the composition A.

EXAMPLE 36

A test paper was prepared in the same manner as in Example 33 except that 220 parts of the composition N prepared in Example 24 was used in place of 220 parts of the composition A.

Comparison Example 7

A test paper was prepared by printing yellow ink on a paper by an off-set printing. This paper was not coated with microcapsules containing an ultraviolet absorber.

Comparison Example 8

(1) Composition (P)

A quantity of 60 parts of 8% aqueous solution of acetoacetyl-modified polyvinyl alcohol (brand name: Gohsefimer Z-200), 32 parts of ultrafinely divided zinc oxide (particle size: 0.005~0.01 μm) and 50 parts of water were mixed together to obtain Composition (P).

(2) Preparation of test paper

A test paper was prepared in the same manner as in Example 33 except that 220 parts of the composition P was used in place of 220 parts of the composition A.

Comparison Example 9

A test paper was prepared in the same manner as in Example 33 except that 70 parts of the composition G prepared in Comparison Example 2 was used in place of 220 parts of the composition A.

The 7 kinds of test papers thus obtained were tested for optical density of the printed yellow images by a Macbeth densitometer (Model RD-914, product of Macbeth Corp.) using a blue filter. The above test paper was exposed directly to sunlight for 10 days, and optical density of the printed yellow images was again measured in the same manner as above for the evaluation of light resistance. Table 4 shows the results.

TABLE 4

| | optical density of printed image | |
|---|---|---|
| | before exposure to light | after exposure to light |
| Ex. 33 | 0.70 | 0.60 |
| Ex. 34 | 0.70 | 0.59 |
| Ex. 35 | 0.70 | 0.66 |
| Ex. 36 | 0.70 | 0.68 |
| Com. Ex. 7 | 0.75 | 0.30 |
| Com. Ex. 8 | 0.49 | 0.41 |
| Com. Ex. 9 | 0.55 | 0.41 |

As apparent from Tables 1 to 4, the present microcapsules having an ultraviolet absorber enclosed therein absorb ultraviolet ray efficiently and are excellent in preventing deterioration of a substrate against light. Further, a heat sensitive recording material using such microcapsules is extremely low in color change of the background area and excellent in color forming ability and record image preservability.

We claim:

1. Microcapsules having an ultraviolet absorber comprising a benzotriazole derivative which is liquid at ordinary temperature and as required an organic solvent enclosed therein, which have capsule wall film of synthetic resin selected from the group consisting of polyurea resin, polyurethane polyurea resin and aminoaldehyde resin, and mean particle size of 0.1 to 3 μm.

2. Microcapsules as defined in claim 1 wherein the polyurethane·polyurea resin is one which is prepared by use of an adduct of xylylene diisocyanate and trimethylolpropane.

3. Microcapsules as defined in claim 1 wherein the polyurea resin or polyurethane·polyurea resin is one which is prepared by use of hexamethylene diisocyanate derivative having a viscosity of up to 1000 cps as determined by a Brookfield type viscometer at 25° C.

4. Microcapsules as defined in claim 3 wherein the hexamethylene diisocyanate derivative is an isocyanate compound containing as a main component an isocyanurate type trimer of hexamethylene diisocyanate.

5. Microcapsules as defined in claim 1 wherein the benzotriazole derivative is at least one selected from the group consisting of 2-(2'-hydroxy-3'-dodecyl-5'-methylphenyl)-benzotriazole, 2[2'-hydroxy-4'-(2"-ethylhexyl)oxyphenyl]-benzotriazole, octyl 5-tert-butyl-3-(5-chloro-2H-benzotriazole-2-yl)-4-hydroxybenzene-propionate, and condensate of methyl 3-[3-tert-butyl-5-(2H-benzotriazole-2-yl)-4-hydroxyphenyl] propionate and polyethylene glycol (molecular weight: about 300).

* * * * *